United States Patent [19]
Laux

[11] 3,709,094
[45] Jan. 9, 1973

[54] METHOD OF CUTTING LOW DENSITY MATERIALS AND IMPROVED CUTTER EMPLOYED THEREWITH

[75] Inventor: Leon E. Laux, Baltimore, Md.

[73] Assignee: Martin Marietta Corporation, New York, N.Y.

[22] Filed: Sept. 15, 1970

[21] Appl. No.: 72,293

[52] U.S. Cl. ................................. 90/11 C, 144/119
[51] Int. Cl. ................................................ B23c 3/00
[58] Field of Search ............. 90/11 C, 11 R, 14, 13.5; 30/276, 264; 144/136 R, 119

[56] References Cited

UNITED STATES PATENTS

| | | |
|---|---|---|
| 2,855,664 | 10/1958 | Griffith et al. ........................ 90/11 C |
| 1,269,619 | 6/1918 | Lepper ................................. 83/1 X |
| 3,269,010 | 8/1966 | Bettcher ............................... 30/276 |
| 2,929,299 | 3/1960 | Jenkins .............................. 144/219 X |
| 2,180,823 | 11/1936 | Harrison ........................... 83/490 X |

*Primary Examiner*—Gil Weidenfeld
*Attorney*—James B. Eisel and Gay Chin

[57] ABSTRACT

A high speed, continuously rotating cup-shaped cutter is moved generally parallel to its axis of rotation and against a foamed plastic or honeycomb core billet to sever the honeycomb core cells at generally right angles to their axis, with the plane of the circular cutting edge at some angle to each of the side walls forming the individual core cells.

3 Claims, 7 Drawing Figures

INVENTOR
LEON EDWARD LAUX

BY Sughrue, Rothwell, Mion, Zinn & Macpeak

ATTORNEYS

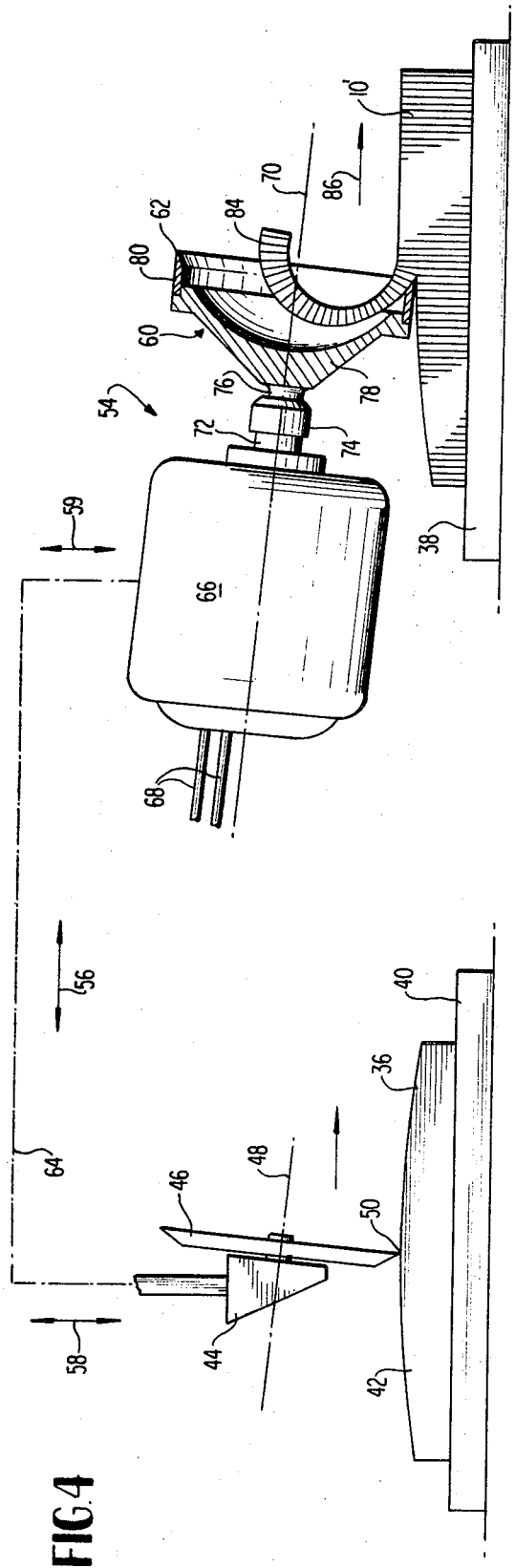
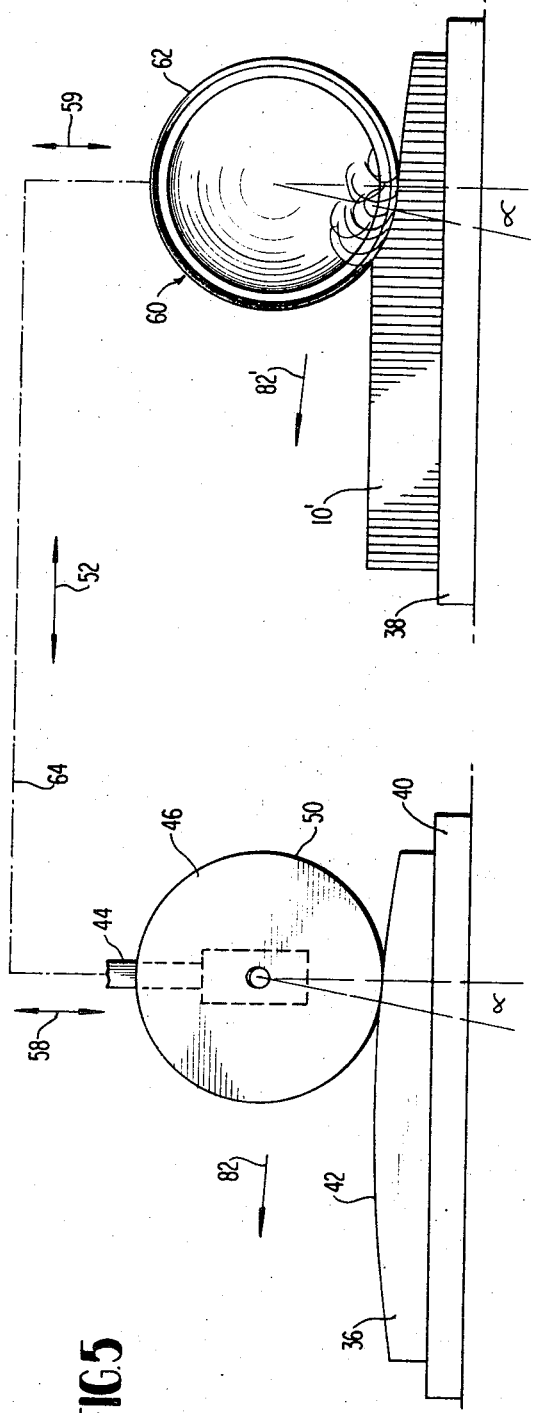
FIG.4
FIG.5
INVENTOR
LEON EDWARD LAUX
ATTORNEYS

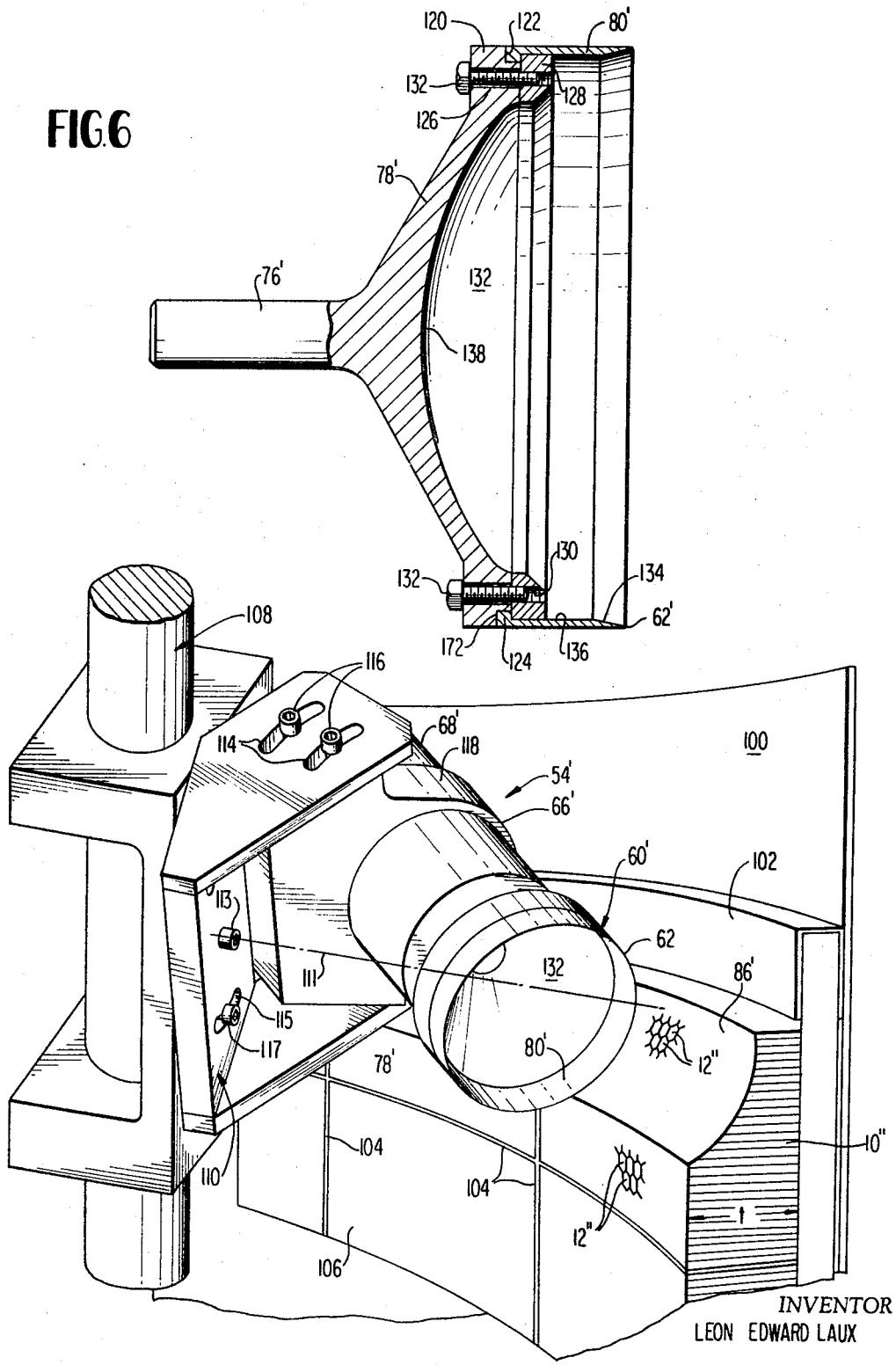

METHOD OF CUTTING LOW DENSITY MATERIALS AND IMPROVED CUTTER EMPLOYED THEREWITH

BACKGROUND OF THE INVENTION

1. Field of the Invention

This invention relates to high speed cutters for cutting low density materials, such as metal and paper honeycomb billets and foamed plastic billets, and, more particularly, to a cutter capable of producing three-dimensional contouring of such billets without tearing the material being cut, or causing burrs at the severed surface areas.

2. Description of the Prior Art

Low density materials, such as foamed plastic, and metal and paper honeycomb core materials have been severed by high speed rotary cutters which make spaced reciprocating passes or are continuously fed through the materials and generally at some angle to the axis of the individual core cells, resulting in contouring of the same.

In one typical contouring apparatus for a honeycomb core billet, the billet, for instance, is positioned with the axis of the individual honeycomb core cells vertical and with the longitudinal axis of the billet lying generally horizontal. In identical, laterally spaced fashion, is positioned a master template or model having a two-dimensional curvature, that is, for instance, the upper surface of the same has a curvature which varies in height along the longitudinal axis but is constant with respect to the lateral right angle horizontal axis. A hydraulically actuated sensor probe contacts the contoured surface of the template or master model and is moved longitudinally while being incremented laterally. This compound movement both in horizontal and vertical directions, depending upon the template configuration, is transmitted by hydraulic-mechanical means to the support for the cutter overlying the honeycomb billet to be contoured. Feed can be either incremental or continuous on a rotary machine.

A typically conventional "mushroom" or "valve stem" cutter comprises a rotating cutting disc of from one-half to 8 inches in diameter coupled to or integrally formed with a thin cylindrical rod or stem which, in turn, is received by a chuck member associated with a rotary drive motor, either pneumatic, or electrical, and rotated at varying speeds. Thus, the cutter itself is characterized by a circular cutting edge and the cutter is constituted by a flat disc extending outwardly from the end of the support rod or stem. Contouring or cutting is achieved by rotating the cutting tool about its axis and moving the cutter generally at right angles to the axis of rotation with the circular cutting edge contacting the honeycomb billet and with the plane of the cutting disc being generally at right angles to the axis of the honeycomb cores. By shifting the cutter along its axis of rotation during a pass, two dimensional contouring occurs.

Since the high speed rotating cutting disc is moved at right angles to the axis of rotation into abutment with the low density material (such as the honeycombs having their core axis at right angles to the plane of rotation of the disc) the severed material which passes over the backside of the rotating disc tends to ball up on the backside of the tool. In some cases, it moves outside the periphery of the rotating tool, and into contact with the unsevered portion of the workpiece. This tends to damage the same and to interfere directly with the cutting of new material. In an attempt to prevent this action, a plurality of axially spaced secondary cutting discs have been added to the main disc supporting stem at axially spaced locations and, while the effect of the additional cutting tool is to prevent the accumulation of large balls of severed material, the depth of cut has been limited primarily to the presence of the accumulated material subsequent to severing of the same.

Additionally, instead of raising and lowering the cutting disc with respect to the billet of material, i. e., to move the plane of the cutting disc toward and away from the workpiece to cause a variance in the thickness of cut and therefore to provide two-dimensional contouring, it is possible to achieve side-to-side or three dimensional contouring by inclining the axis of the mushroom cutter in the direction of movement of the cutter (which is perpendicular to the axis of rotation and generally longitudinal of the billet). This is called "plow" contouring. Single contour machining is accomplished by either the "tangential" or "plow" methods. The "tangential" method requires the cutter axis to be tilted sideways so the face of cutter is tangent with cutting surface and constitutes a fourth axis machine movement (angle varies with each pass). With the "plow" method, the cutter axis remains vertical with reference to side motion but is tilted at a fixed angle in direction of cut.

SUMMARY OF THE INVENTION

The present invention is directed to a fundamentally novel concept of moving a circular cutting edge against a honeycomb billet with the plane of the cutting edge at some angle to the plane of all sidewalls of each honeycomb core cell so as to prevent sidewall bending during severing, resulting in the burr free surface in the area of severance.

The present invention further involves the concept of moving a high speed circular cutting edge generally parallel to its axis of rotation against all known light density materials, such as paper and metal honeycomb core billets and foam material, such as foamed plastic billets, to effect cutting of the same without any tearing of the material at the severed surface area while producing a burr free cut.

The invention contemplates the employment of a high speed rotating cylindrical cutting tool preferably cup-shaped in form, which is rotated about its axis and moved generally parallel to its axis of rotation to achieve cutting while permitting orthogonal shifting for facilitating three-dimensional contours of low density material billets.

Specifically, the honeycomb contouring machine of the present invention is capable of reproduction, from template profiles or master model contours, of cylindrically shaped honeycomb structures facilitating the contouring of a honeycomb or other low density material structure of different and varying diameters, lengths, and profiles. Since the circular cutting edge is moving parallel to the axis of rotation of the same, repeated laterally incremented parallel passes may be made across a cylindrical or planar workpiece to readily achieve three-dimensional, contouring. Alternatively, a continuous spiral cut may be employed. The circular cutting edge is defined by a cylindrical cutting tool supported on the peripheral edge of a cup-shaped support member carrying a central, integral support shaft. A cylindrical cutter blade is preferably replaceable on a cup-shaped support to reduce cost and allow ready sharpening of the edge of the same. The cylindrical cutting blade is generally triangular in longitudinal cross section and may have a tapered, flat, or slightly concave internal surface.

The cutter assembly may be stationary with workpiece moved in direction of open face of cutter. The cup-shaped cutter assembly in moving axially in the direction of its open end thus causes the cut material to curl into and out of the open end of the cutter with no interference to the cutting operation.

BRIEF DESCRIPTION OF THE DRAWINGS

FIG. 4 is a side elevational, schematic view of the improved method of three-dimensional contouring of low density material of the present invention as applied to a honeycomb core billet;

FIG. 5 is a schematic end view of the elements illustrated in FIG 4 employing the method of the present invention;

FIG. 6 is a sectional view of one form of the cup-shaped cutter employed in the present invention;

FIG. 7 is a perspective view of the improved cutter of the present invention employed in contouring a cylindrical billet.

DESCRIPTION OF THE PREFERRED EMBODIMENT

Figure 1:
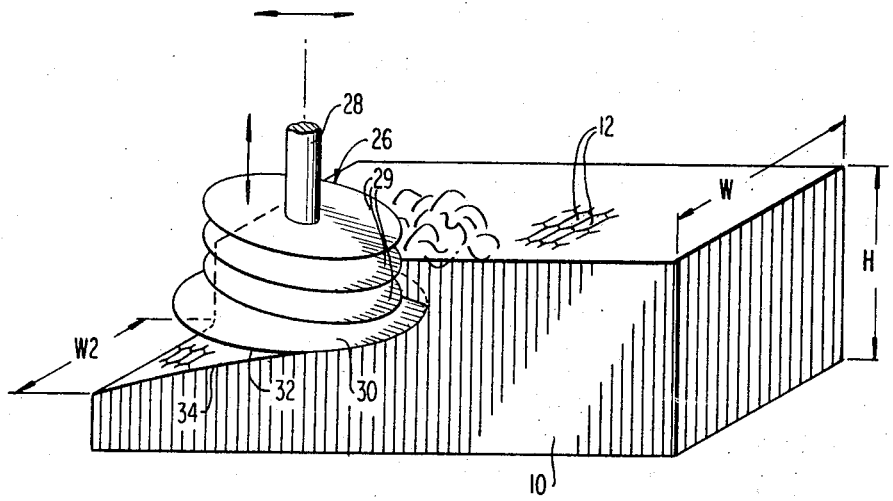
FIG. 1 is a schematic, perspective representation of a prior art rotating disc "valve stem" cutter for two-dimensional contouring of a honeycomb core billet.

Referring to the drawings, FIG. 1 is a schematic representation, in perspective, of the prior art cutter employed in severing and providing a desired contour to a billet 10 of honeycomb core material. In this respect, the honeycomb core material may comprise lightweight metal, such as an aluminum alloy or, alternatively, the honeycomb material may be formed of thin foils of paper, fiberglass, plastic or other metal foil material. The honeycomb core billet is comprised of a plurality of individual core cells 12 whose axis is illustrated as being vertical and at right angles to the longitudinal plane of billet 10. In this respect, it is noted that each core cell is hexagonal in that it includes six side walls. Prior to contouring, the billet is provided with an initial height H and a lateral width W.

The prior art "valve stem" cutter comprises a unitary or composite assembly 26 including a shaft or stem 28 and a thin cutting disc 30 carried at the end of stem 28 having a sharpened edge 32. As illustrated, during the first longitudinal pass through the billet 10, a width of material W2 is severed from the billet.

Figure 2:
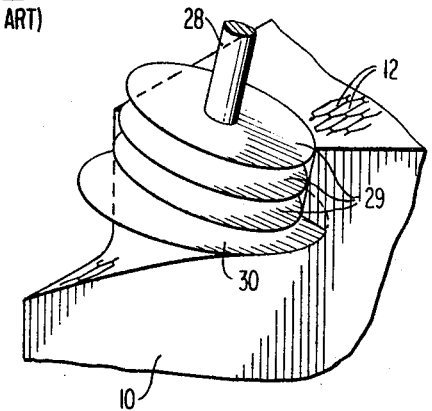
FIG. 2 is a similar perspective view of prior art valve stem tilted cutter to illustrate three dimensional contouring.

With the shaft 28 oriented vertically, that is, generally in line with the axis of the individual core cells 12, a variable thickness or height cut is achieved by raising and lowering the cutter disc 30 during longitudinal travel, thus producing, as illustrated, an inclined cut as indicated by severed surface 34. Thus, with the shaft 28 rotating at high speed by power means (not shown), further power means are provided for causing the moving cutter blade to move from left to right and then to reverse its operation to cause multiple overlap sweeps of the rotating cutter blade through the material while raising and lowering the same to provide a two-dimensional contouring to the block or billet 10. Due to the configuration of the cutter, and the fact that the cutting plane defined by circular edge 32 of the disc 30, a change in contour may be achieved in the direction at right angles to the axis of rotation of shaft 28 along the line of sweep. As evidenced in FIG. 1, the cutting edge 32, in its frictional slice through the honeycomb billet, causes the material being severed to ball up on the front end of the blade and between the blade and the uncut portion of the billet. This interferes with proper contouring or severing of the billet and, in the past, it has been necessary to equip the mounting shaft or stem 28 with a series of axially spaced secondary cutting discs 29 which tend to mulch the ball of severed material and to reduce its adverse effects. Three dimensional contouring is achievable by inclining the shaft 28 in the direction of sweep as illustrated in FIG. 2.

Turning to FIGS. 4 and 5, the highly improved compound contour i. e., density machining method of the present invention, as applied especially to contouring of honeycomb core billets, is illustrated schematically in relation to the somewhat standard arrangement of continuously varying the position of the high speed rotating cutter during its laterally incremented, longitudinal sweeps across the billet. Such movements are controlled by a sensing mechanism contacting a previously contoured master model. In this respect, both the honeycomb core billet 10' and the model 36 are positioned on support blocks 38 and 40, respectively, which are, in this case, fixed in position and the longitudinal axis of both the model 36 and the honeycomb billet 101 are oriented horizontally. The model 36 has a curved upper surface 42 which is semi-spherical, i.e., it is convex both in a longitudinal direction and laterally at right angles thereto, as evidenced in FIG. 5. Thus, the upper surface 42 of the model 36 is curved three-dimensionally. Appropriate means (not shown) such as a hydraulic cylinder or the like causes simultaneous Y axis, or horizontal movement, for support 44 for the disc-shaped tracer stylus 46, which is mounted for rotation about axis 48 by suitable means, and cutter assembly 54. The disc stylus is provided with a thin peripheral edge 50 which contacts the profile model 36 as it moves longitudinally across the same in a series of laterally incremented sweeps. In the case of the illustrated honeycomb material, the sweeps are on the order of 0.100 – 0.200 inch apart. Arrow 56 indicates the direction of movement of the hydraulically and/or mechanically interconnected cutter assembly 54 and disc-shaped tracer 46. Arrow 52 indicates the lateral stepping or incrementing of the assemblies to achieve the series of longitudinal, incremental cuts in removing the material from the billet 10', while the arrows 58 and 59 indicate respective movements of the hydraulic means for maintaining the tracer disc stylus 50 in contact with the template during tracing and the cutter assembly 54, in particular, the improved cutter 60 in cutting contact with billet 10'. In the schematic representations of FIGS. 2 and 3, the broken line 64 connecting the cutter assembly 54 and the stylus 46, represents the hydraulic-mechanical interconnection means for effecting synchronized movement of both of these elements.

It is important to note that the diameter of the disc stylus 46 corresponds to the diameter of the cutter 60, that is, the circular trace of the peripheral tapered edge 50 of the stylus 46 corresponds to the circular trace of the circular cutting edge 62 of the improved cutter 60. Thus, the disc-shaped tracer stylus simulates the face of the cup-shaped cutter. While not shown, the mounting means for supporting the cutter assembly 54 allows adjustment of the cutter 60 to the same attack or clearance angle as the disc 50 for accurate reproduction of template or master model contours. In the manner of broken line 64, the trace system and the cutter motor are mounted on a common carriage with provisions for initial manually controlled retraction of the carriage from the template and workpiece.

The cutter assembly 54 preferably comprises a high speed, pneumatic or electric motor 66 of conventional construction to which power is delivered to and returned from the motor via coupling lines 68. The motor is illustrated as being inclined slightly from the horizontal with the axis of rotation intersecting the billet 10'. At the forward end of the pneumatic motor 66, there is provided a drive shaft 72 carrying a chuck 74 which receives the stem end 76 of the unitary or composite, cup-shaped cutter 60 forming an important aspect of the present invention. In this regard, a schematic representation illustrates the cutter 60 as having integrally formed with stem or shaft 76, a cup member 78 whose open end faces the billet workpiece 10' and to the periphery of which is attached a modified, cylindrical cutting blade 80 whose outer edge 62 defines the line of cut for the assembly. It is important to note that not only is the high speed rotating cutter 60 inclined downwardly from the horizontal towards the underlying honeycomb 10', but in addition it is tilted slightly to one side such that the cutting plane, defined by edge 62, while being perpendicular to the axis of rotation is generally parallel to the direction of movement. This is best seen by reference to FIG. 3. The plane defined by the cutting edge 62 of the improved cutter 60 is perpendicular to the direction of movement of the cutting assembly as it makes its repeated, laterally incremented, longitudinal cutting sweeps through the billet 10'. Further, and more importantly, the plane defined by the circular cutting edge 62 is, through proper orientation of the cutting assembly 54, at all times at some angle to the individual walls 14, 16, 18, 20, 22, and 24 of the individual honeycomb cells 12' making up the honeycomb billet 10'. This insures the frictional severance of the individual sidewalls making up the core cells, preventing rollover of any portion of the cell wall and minimizing the presence of burrs at the severed surface of the billet. In FIG. 5, incremental feed is illustrated by arrow 52 and this, in combination with the rise of the stylus as it moves laterally up and over the outer surface 42 of the master template 36, causes slight movements to both disc stylus 46 and the cup-shaped cutter assembly 60 as illustrated by arrow 82 for the stylus and 82' for the cutter 60.

In moving longitudinally through the billet 10', FIG. 4, the high speed rotating cutter 60 causes a severed portion 84 of billet 10' to curl into and out of the open end of the cup-shaped cutter without any interference to the transversely moving cutter assembly 54, the direction of cut indicated by arrow 86. It is noted that the finished contour defined by the severed surface is convex, both in the side view of FIG. 2 and in the end view of FIG. 3.

Therefore, it is readily apparent that the method of the present invention involves, in general, the movement of a circular cutting edge 62 through a honeycomb billet with the plane of the cutting edge at some angle with all side walls of each core cell to insure the severence of the same without burrs to the finished surface. Further, in conjunction with low density materials in general, such as foamed plastic, the method of the present invention is characterized by the movement of a continuously rotating circular cutting edge, generally parallel to its axis of rotation and against a light density workpiece to effect severence of the same without any tearing of the lightweight material.

The sequence of longitudinal sweeps, stepped in generally parallel planes, creates a slightly scalloped surface which, depending on the distance of lateral incrementation of the cutter, may be totally invisible to the naked eye. At the same time, due to the nature of the cutting tool, three-dimensional contouring is readily achieved by a single series of cutting strokes along spaced parallel paths. It is noted that both the contact point between the disc-shaped tracer stylus 46 and the cutting edge 62 of the cup-shaped cutter are not in line with the vertical axis of support 44 for the disc and the direction of movement identified by arrow 59, but vary, depending upon the specific contour of the model template 36, in the illustration shown. Due to the lateral contour of the surface 42, the contact point between disc 46 and said surface is shifted from the vertical by an angle $\alpha$ which is identical insofar as the circular cutter 60 is concerned. Inaccurate contouring would result if, in fact, the probe or sensor 46 constituted a point probe rather than a circular probe corresponding to the contour of the cutting cup edge.

The applicability of the present cutter and its specific construction as employed in the internal contouring of a cylindrical shaped honeycomb structure to produce three-dimensional surface contours, may be readily seen from FIG. 7. In this case, an annular, vertical frame or sidewall 100 acts in conjunction with rim 102 to vertically support a billet 10" whose individual honeycomb core cells 12" have their axes generally horizontal. A thin aluminum foil is bonded to outer surface of the honeycomb billet which is held securely to inner surface of cylindrically shaped holding tool by vacuum. The foil on outer surface of honeycomb is machined off with honeycomb when outer surface of honeycomb is machined. The billet is formed of several pieces of honeycomb material coupled together by a suitable adhesive at 104. It is noted that the inside face 106 of the composite billet 10" is generally concave and the billet is of a uniform thickness $t$. With the billet 10" rotatably mounted and oriented vertically, the method of the present invention employs a cutter assembly 54' comprised essentially of an arm assembly 108 including a U-shaped bracket 110 mounted for rotation about horizontal axis 111 via pin 113 which extends from a reversely directed fixed U-shaped bracket 112. This allows rotation of one bracket 110 about the other bracket 112 to vary the angle of inclination of the cutter assembly 54' about a horizontal axis passing through the centers of both brackets 110 and 112. One or more slots 115 and set screws 117 allow locking of bracket 110 at a selected angular position. Bracket 110 carries suitable slots 119 and set screws 116 which adjustably support plate 118 and air motor 66'. The air motor 66' may have a suitable housing (not shown) surrounding the same to which may be coupled suction means (not shown) for removing exhaust air after passing through the motor, since this air generally carries a limited amount of lubricating oil in the form of oil vapor which adversely affects subsequent bonding of metal foils to the contoured face 86' of the honeycomb core billet 10''. The cup-shaped cutter assembly 60', FIG. 6, consists of a specially formed, modified, cylindrical cutting blade 80' which is appropriately demountable from the cup-shaped support 78' which is integral with the cutter drive shaft 76'. In this respect, the cup-shaped support 78' is provided with an annular flange portion 120 having an annular recess 122 formed in its forward face and outer periphery, of rectangular cross section, and adapted to receive the flanged inner end 172 of the cylindrical blade 80'.

Preferably, as further indicated in FIG. 6, the flanged outer end of the cup-shaped support member 78' carries holes 126 at circumferentially spaced locations and the assembly further incorporates a coupling ring 128 which is tapped and threaded at 130. The inner end of the cylindrical cutter blade, which forms a removable attachment to the assembly, carries an inwardly directed flange 124 rectangular in section, which seats within recess 122 and is held in place by the coupling ring 128. The ring 128 sandwiches the blade flange between itself and flange 120 of the cup-shaped support 78'. A series of threaded mounting screws 132 couple these members together and form an assembly in which the cylindrical cutter blade 80' constitutes a replaceable insert thereof. In this respect, the blade is of uniform thickness over the major portion of its length, however, the front face of the same is tapered as at 134 to form a sharp cutting edge 62' in the manner of the schematic representation in FIGS. 2 and 3. This tapered surface 134 may be straight, or slightly arcuate, i. e., concave, to cooperate with the intermediate surface portion 136 and the interior inner surface 136 of the cup-shaped support to define a cavity or chamber 132 which readily receives the material being removed from the low density material. The material curves due to surface 134 and, while the material balls up, it is readily received within the cavity 132.

In this embodiment of the invention, the honeycomb contouring machine comprises a three-axis (X-vertical, Y-transverse, Z-rotary or longitudinal) machine designed specifically for reproduction of a template or profile or master model contours in cylindrical shaped honeycombed structures such as composite billet 10''. In this respect, a cylindrical profile (not shown) identical to that of the finished or machined billet 10'' is mounted either above or below the workpiece or billet 10'' that is axially displaced on the vertical or rotating axis of the machine. The primary contouring mechanism is integrated into an X-Y axis control column coaxially of honeycomb core billet 10'' which facilitates rearrangement of the cutter, the billet, and the templates as required to accommodate honeycomb structures of different or varying diameters, lengths and profiles. The X axis vertical movement is powered by a variable speed motor (not shown) which drives a lead screw (not shown) with an infinitely variable speed range from 0 to 8 inches per minute to provide the desired increment or continuous feed in the vertical direction. For initial positioning of assembly arm 108, the power is provided with a rapid disconnect for manual feed adjustment.

The Y axis horizontal movement is actuated by a hydraulic cylinder (not shown) to the immediate left of mounting arm 108 which is controlled precisely by a "-mimik" hydraulic trace of the template or master model preferably positioned above the billet 10'' and mounted on the vertical support shell 100. In like manner to the schematic arrangement of FIGS. 2 and 3, a disc-shaped tracer stylus (not shown) which is of a diameter identical to the cup-shaped cutter and simulates the face of the same, that is, the cutting plane of the cutting edge 62', is adjusted to the same attack and clearance angle as is cutter 80' for accurate reproduction of the template profile or master model contour. The trace system and cutter motor 66' are mounted on a common carriage with provisions for manually controlled retraction of the carriage from the template or workpiece 10''. In this case, for an internal contouring operation, rotation of the work holder about the vertical axis is achieved by use of an infinitely variable speed motor through "a torque-tamer" clutch (not shown) providing speed ranges from 0 to 6 rpm or 0 to 150 ft./min. circumferential speed, depending on the structural integrity and material forming the low density billets.

Figure 3:
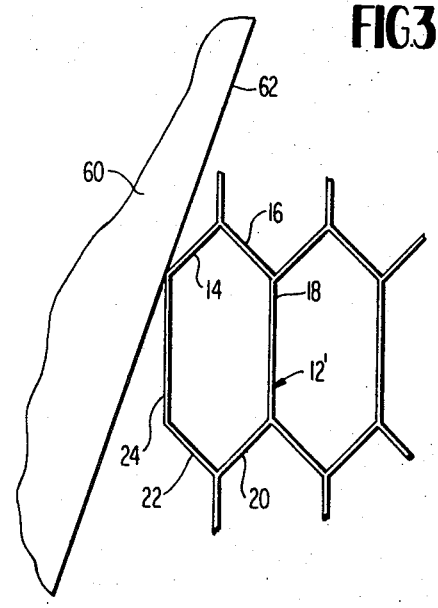
FIG. 3 is a plan view of the improved cutting arrangement of the present invention as applied to honeycomb core material.

It is evidenced from viewing FIGS. 3 and 7, with the inwardly and downwardly inclined, continuously rotating high speed cutter 60 in passing through the honeycomb billet 10, the plane of the cutting edge 62' is at all times at some angle with the six side walls of each core cell so that, in severing the same, none of the walls or portions thereof are bent over to create burrs characteristic of prior art contouring operations. Further, in contrast to the prior art, as evidenced in FIG. 7, the circular cutting edge 62' rotates at high speed and moves generally parallel to its axis of rotation in severing the material, which has the added effect of preventing tearing of the billet 10'' in the severed surface area. Incrementing vertically about the X-axis is readily achieved, preferably in increments of from 0.100 inches to 0.500 inches for each revolution of workholder 100. If the sensor, in following the concave master, moves horizontally along the Y-axis, either in or out, it is obvious that the cutting tool moves into or out of the billet 10' to follow the same. Further, during vertical incrementing, such radial movement toward and away from the vertical axis of rotation results in horizontal radial contouring and vertical contouring occurring by multi-sweep effects, to provide a three-dimensional contour greatly desired in the industry, especially for aircraft manufacture.

In the present cutter, since it moves generally parallel to the axis of rotation of the circular cutting edge, radial shifting readily creates various undulating profiles in a billet which in itself is either concave or convex, i. e., constitutes a cylinder or a portion thereof. In such an instance, it is unnecessary to initially start with billets of rectangular block form. With the vertical incrementation, the series of vertically incremented, horizontally varied arcuate cuts provides a surface which is infinitesimally scalloped but unnoticed in the finished product due to the short step incrementation in the vertical direction.

It is obvious that the modular concept employed in the present design enables the rearrangement of components to accommodate different workpiece diameters, lengths and profiles. The machine of the present invention is the only known machine in existence using a cup-shaped cutter which is readily adaptable to contouring cylindrical shaped parts and capable of considerably higher rate of material removal. The circular cutting edge 62' of the tool is limited only by the diameter of the cup-shaped forming assembly. Since the removed material readily moves into and out of the recess or open end 132 of the same, relatively deep cuts may be made in the low density billets without affecting the cutting rate or the removal of waste. Billets which range in size from six to ten feet in diameter and one-half to 6 feet in length may be readily contoured by the illustrated machine.

The contouring is achieved with faster material removal, simplified manipulation of tool, cutting too, and improved part finish to the contoured product, the elimination of roughing cut, and is highly adaptable, in particular for contouring or sculpturing of irregular cylindrical shapes. The cylindrical cutting blade 80' may be integrally formed with the cup-shaped support 78, may be separately formed and adhesively coupled thereto, may be welded to the cup, or may be detachably coupled by the flange arrangement of the embodiment of FIG. 6. The cylindrical cutting insert may comprise carbide or other hardened material suitable for forming cutting tools and may constitute any known tool material. With the air motor 54 or 54' causing rotation of the improved cutter at speeds up to 9,000 rpm, removal of low density material by frictional severance is easily achieved at longitudinal incremented or arcuate cutting strokes of up to 150 feet per minute, depending of course on the consistency of the material being cut.

What is claimed is:

1. A method of contouring low density, honeycomb core material comprising the step of relatively moving a high speed continuously rotating cylindrical cutter having a circular cutting edge through a billet of honeycomb material generally parallel to its axis of rotation with the axis of the honeycomb core cell generally at right angles to the path of movement of the cutter, so that the plane of said cutting edge will be at some angle with respect to all sidewalls of each core cell to prevent bending over of small portions of said sidewalls and to thereby eliminate burrs on the severed surface of the contoured billet.

2. The method of cutting honeycomb core material as claimed in claim 1, wherein said continuously rotating circular cutting edge comprises the outer peripheral edge of a cup-shaped cutter rotating about its axis and said method further comprises: inclining said cup-shaped cutter slightly toward said honeycomb billet and laterally to one side of the longitudinal axis of the same.

3. The method of contouring a honeycomb billet as claimed in claim 1, wherein said billet is cylindrical in form, said cutter assembly is mounted for rotation relative to said billet about an axis common with said billet axis, and said method further includes the step of incrementing said circular cutting edge through said cutting material about said cutter assembly axis of rotation with the plane of said cutting edge angled slightly from a position parallel with said common axis and from a position at right angles to said honeycomb billet.

* * * * *